ABSTRACT OF THE DISCLOSURE dl-Camphor-10-sulfonic acid is resolved in acetone via addition of 0.5 equivalents of resolving amine, α-d-4-dimethylamino-1,2-diphenyl-3-methyl-2-butanol. Crystalline α-d-4-dimethylamino-1,2-diphenyl - 3 - methyl-2-butanol d-camphor-10-sulfonate precipitates from the resolution mixture, is separated therefrom to afford d-camphor-10-sulfonic acid and the resolving amine on treatment with base. Addition of two equivalents of α-dl-4-dimethylamino-1,2-diphenyl-3-methyl-2-butanol to the remaining resolution mixture provides α-l-4-dimethylamino - 1,2 - diphenyl-3-methyl-2-butanol l-camphor-10-sulfonate as a crystalline precipitate. Treatment of the latter precipitate with base affords l-camphor-10-sulfonic acid and recoverable l-4-dimethylamino - 1,2 - diphenyl-3-methyl-2-butanol. d- and l-Camphor-10-sulfonic acids can each be employed in the resolution of α-dl-4-dimethylamino-1,2-diphenyl-3-methyl-2-butanol in the preparation of d-propoxyphene and levopropoxyphene.

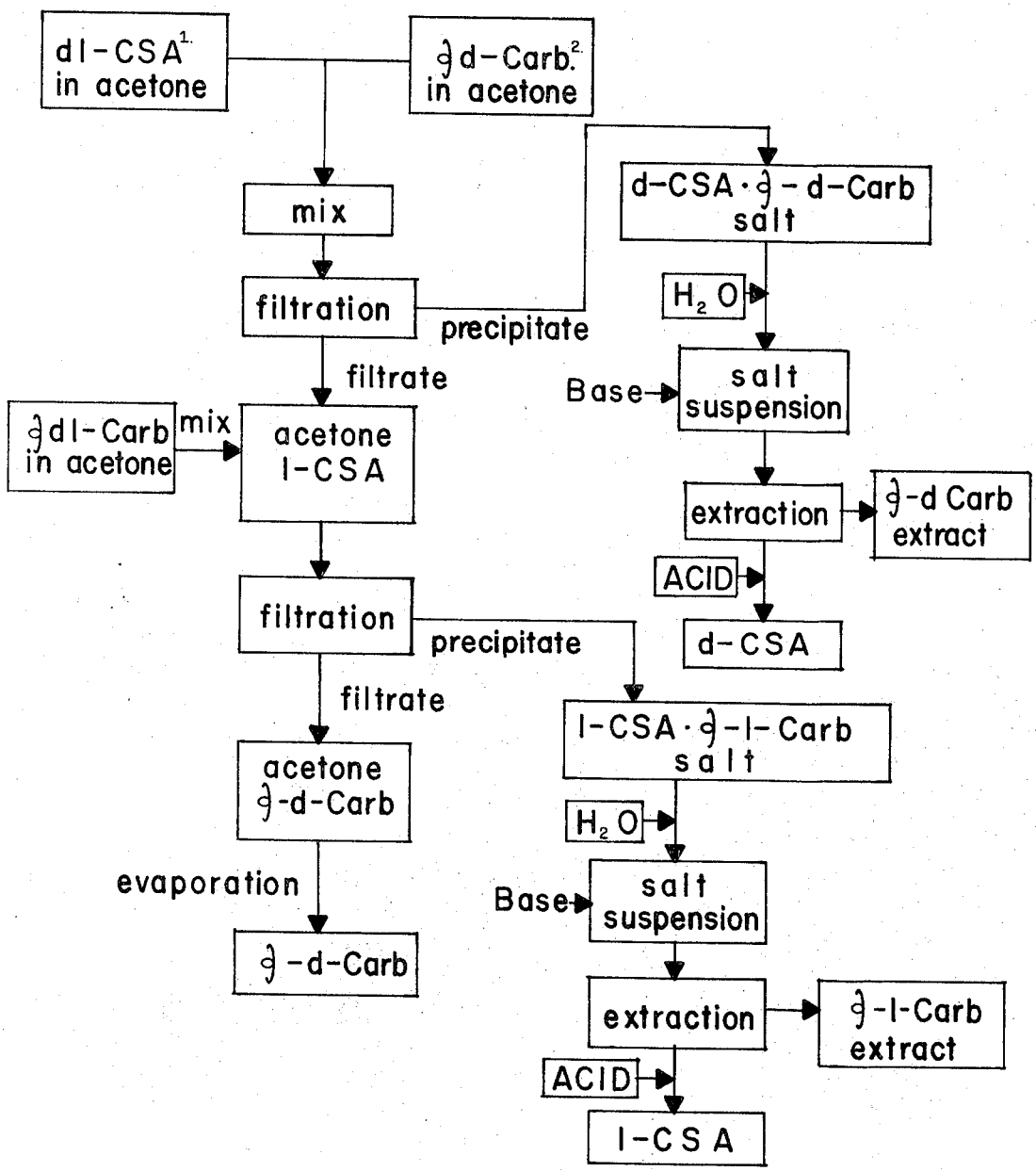
1/ Camphor-10-sulfonic acid
2/ 4-dimethylamino-1,2-diphenyl-3-methyl-2-butanol 3,819,689
RESOLUTION OF dl-CAMPHOR-10-SULFONIC ACID
Wayne E. Thompson and Albert Pohland, Indianapolis, Ind., assignors to Eli Lilly and Company, Indianapolis, Ind.
Filed June 23, 1971, Ser. No. 155,981
Int. Cl. C07c *143/00*
U.S. Cl. 260—503           2 Claims

BACKGROUND OF THE INVENTION d-Camphor-10-sulfonic acid is a commonly used acid for the resolution of racemic mixtures of organic compounds containing basic amino groups. The use of the acid as a resolving agent is illustrated by the process for resolving alkyl-DL-tryptophanes as described in U.S. Pat. 2,813,876. The acid has achieved considerable commercial importance as the resolving agent in the process for the manufacture of the widely used non-narcotic analgesic, d-propoxyphene hydrochloride, *J. Am. Chem. Soc.*, 77, 3400 (1955), and l-propoxyphene an antitussive agent.

d-Camphor-10-sulfonic acid is prepared by the sulfonation of natural d-camphor, *Org. Syn.*, 45, 12 (1965). Natural camphor, or Japan camphor, is the dextrarotatory isomer obtained from the camphor tree, *Cinnamomum camphora*. Commercial users of d-camphor-10-sulfonic acid, requiring large quantities of d-camphor for conversion to the acid, have sometimes experienced difficulty in obtaining continuous supplies from natural sources. Consequently, there is a need for an additional source of d-camphor-10-sulfonic acid in order to asure adequate availability for commercial processes.

Synthetic dl-camphor, prepared from α- or β-pinene derived from turpentine, can be sulfonated by known procedures, to yield dl-camphor-10-sulfonic acid. An efficient, economical method of resolving the racemic dl-camphor-10-sulfonic acid into its d- and l-enantiomorphs would provide an alternative source of d-camphor-10-sulfonic acid.

SUMMARY OF THE INVENTION

This invention provides a novel process for resolving dl-camphor-10-sulfonic acid. In particular this invention provides a process for resolving dl-camphor-10-sulfonic acid in conjunction with the manufacture of d-propoxyphene hydrochloride and l-propoxyphene. This invention further provides commercial quantities of l-camphor-10-sulfonic acid, heretofore unavailable.

α-d-4-Dimethylamino - 1,2 - diphenyl-3-methyl-2-butanol is prepared according to the method described by *J. Am. Chem. Soc.*, 77, 3400 (1955). In the described method, the stereoisomeric intermediates, α-dl-4-dimethylamino-1,2-diphenyl - 3 -methyl-2-butanol, and β-dl-4-dimethylamino-1,2-diphenyl - 3 - methyl-2-butanol, hereinafter referred to as α-dl-carbinol and β-dl-carbinol respectively, are separated and the α-dl-carbinol is resolved to afford α-d-carbinol and α-l-carbinol. d-Camphor-10-sulfonic acid is the preferred agent for the resolution. Esterification of the α-d-carbinol hydrochloride salt obtained upon resolution of the dl-mixture provides d-propoxyphene hydrochloride, while esterification of the α-l-carbinol affords l-propoxyphene.

It has now been found that the solubility characteristics of the isomeric salts of camphor-10-sulfonic acid with α-carbinol are such that when a suitable solvent is employed these substances can be employed as mutual resolving agents to permit a virtually complete resolution of both dl-camphor-10-sulfonic acid and α-dl-carbinol into their respective d- and l-forms.

According to the process of this invention, dl-camphor-10-sulfonic acid obtained by the sulfonation of synthetic dl-camphor, is resolved by employing the α-d-carbinol as the resolving agent. By the addition of slightly in excess of one-half mole of pure α-d-carbinol base to one mole of the racemic dl-camphor-10-sulfonic acid in acetone, there is obtained a crystalline precipitate of α-d-carbinol d-camphor-10-sulfonate which is separated by filtration. The free acid, l-camphor-10-sulfonic acid, remains in solution. Substantially no α-d-carbinol l-10-camphor sulfonate is precipitated in the process.

The α-d-carbinol d-10-camphor sulfonate, on treatment with an apropriate base yields the d-camphor-10-sulfonic acid salt of the added base and the resolving agent, α-d-carbinol. The latter substance is recovered and used, either for the resolution of additional quantities of dl-camphor-10-sulfonic acid or for conversion to d-propoxyphene. The d-camphor-10-sulfonic acid salt thus obtained is acidified and the free acid is in turn employed as a resolving agent for racemic α-dl-carbinol in the d-propoxyphene process or in the resolution of other basis racemic mixtures.

The l-camphor-10-sulfonic acid which remains in the acetone filtrate obtained after the separation of the α-d-carbinol d-camphor-10-sulfonate can be recovered and purified. Alternatively, α-dl-carbinol can be added directly to the filtrate containing the l-camphor-10-sulfonic acid to effect resolution of the carbinol. A ratio of one-half mole of the l-camphor-10-sulfonic acid to 1 mole of α-dl-carbinol is employed in order to obtain a crystalline precipitate of α-l-carbinol l-camphor-10 sulfonate. When l-camphor-10-sulfonic acid in such proportion is employed for resolution, the α-d-carbinol remains in solution as the free base along with minor amounts of the α-d-carbinol l-camphor-10-sulfonate salt. The α-d-carbinol can be recovered from the filtrate, purified, and used either to resolve an additional quantity of dl-camphor-10-sulfonic acid or for the manufacture of d-propoxyphene. The α-l-carbinol l-camphor-10-sulfonate salt on treatment with base affords α-l-carbinol and l-camphor-10-sulfonic acid. The α-l-carbinol thus obtained is employed for the synthesis of levopropoxyphene while the l-camphor-10-sulfonic acid is recovered and used as a resolving agent.

The present invention thus provides a process for obtaining both the d- and l-forms of camphor-10-sulfonic acid without reliance on natural d-camphor. This invention further provides a method for the mutual resolution of dl-camphor-10-sulfonic acid and α-dl-carbinol.

DETAILED DESCRIPTION

According to the present invention, the resolution of dl-camphor-10-sulfonic acid into its optically active d- and l-enantiomorphs with α-d-4-dimethylamino-1,2-diphenyl-3-methyl-2-butanol, is accomplished by the direct precipitation of the d-enantiomorph as the salt of the resolving base. The resolution is carried out by adding one-half equivalent of α-d-carbinol to a solution of the dl-camphor-10-sulfonic acid racemate in a suitable solvent. The d-camphor-10-sulfonic acid precipitates in the form of the salt, α-d-carbinol d-camphor-10-sulfonate, while the l-camphor-10-sulfonic acid remains in solution as the free acid. The resolution is best carried out, in acetone, however, ethanol can be employed with some success. Other solvents such as water and methanol can be employed although the work-up required is more extensive in that the solubility characteristics of the d- and l-acids, the d- and l-carbinols and their respective salts differ somewhat from their solubility in acetone.

The dl-camphor-10-sulfonic acid is dissolved in a convenient volume of acetone and a solution of the α-d-carbinol in a minimum amount of acetone is added with stirring. Although the α-d-carbinol d-camphor-10-sulfonic acid salt will precipitate at room temperature, it is desirable to retain the salt in solution for a longer period by maintaining the solution at the reflux temperature for about 1 to 3 hours. Small amounts of water added to the resolution mixture aid in maintaining the salt in solution during the reflux period. Following the reflux period, the solution is cooled and maintained at a temperature of about 0 to 5° C. for about three hours to insure substantially complete precipitation of the α-d-carbinol d-camphor-10-sulfonate salt. The precipitate is filtered and washed with acetone to provide α-d-carbinol d-camphor-10-sulfonate in substantially pure form.

The filtrate obtained from the above process contains the l-enantiomorph, l-camphor-10-sulfonic acid, which can be recovered therefrom, for example, as an insoluble salt of a suitable base. Alternatively, the acetone solution containing the l-enantiomorph can be used as such in the resolution of α-dl-carbinol as hereinafter described.

The precipitated salt, α-d-carbinol d-camphor-10-sulfonate, on treatment with a suitable base affords α-d-carbinol and d-camphor-10-sulfonic acid as the salt formed with the added base. The α-d-carbinol d-camphor-10-sulfonate salt is suspended in water and the suspension is made alkaline by the addition of a base of sufficient base strength to liberate α-d-carbinol. The preferred base for use in the process of this invention is ammonium hydroxide, although the base employed is not critical and other commonly used strong bases such as sodium hydroxide, potassium hydroxide and calcium hydroxide can also be used. The liberated α-d-carbinol forms as an insoluble oil and is extracted with a suitable solvent such as ether and is recovered as the hydrochloride salt after treatment of the ethereal extract with hydrogen chloride. The d-camphor-10-sulfonate salt in the aqueous phase is acidified with a mineral acid, for example, hydrochloric acid or sulfuric acid and the d-camphor-10-sulfonic acid can be recovered from the aqueous solution. Alternatively, the aqueous solution of the d-acid can be used as such directly for the resolution of α-dl-carbinol.

As previously mentioned, the l-camphor-10-sulfonic acid obtained by the resolution process of this invention need not be isolated in order to be employed as a resolving agent for α-dl-carbinol. Thus, the acetone filtrate containing l-camphor-10-sulfonic acid can be treated with an acetone solution containing two equivalents of α-dl-carbinol with stirring at room temperature. The resulting solution is stirred for about three hours during which time the crystalline salt α-l-carbinol l-camphor-10-sulfonate is selectively precipitated. The α-d-carbinol enantiomorph remaining in solution as the free base can be recovered therefrom and employed in the d-propoxyphene process.

The present invention thus provides a novel process for resolving dl-camphor-10-sulfonic acid with α-l-carbinol as the resolving base. The resolution process is particularly useful in connection with the process for the manufacture of d-propoxyphene and levopropoxyphene. For example, the resolving base α-d-carbinol, a precursor in the synthesis of propoxyphene, is diverted from the d-propoxyphene process to serve as the resolving agent for the dl-camphor-10-sulfonic acid. The resolved d- and l-camphor-10-sulfonic acids can then both be utilized for the resolution of α-dl-carbinol, in the d-proppxyphene synthesis. The α-d-carbinol, resolving agent initially employed, is recovered and can be either converted to d-propoxyphene or be reused for the resolution of additional quantities of dl-camphor-10-sulfonic acid. When d-camphor-10-sulfonic acid is employed as the resolving agent for the α-dl-carbinol, the known salt α-d-carbinol d-camphor-10-sulfonate is obtained and isolated. This salt serves as the source of α-d-carbinol in the synthesis of d-propoxyphene. When the l-camphor-10-sulfonic acid is employed as the resolving agent for α-dl-carbinol, the novel salt α-l-carbinol l-camphor-10-sulfonate is obtained and isolated. This salt serves as the source of α-l-carbinol the precursor of levopropoxyphene.

The accompanying drawing schematically illustrates the resolution process and the following preparation and examples are provided to further illustrate the present invention.

PREPARATION OF dl-CAMPHOR-10-SULFONIC ACID

A 30-gallon glass-lined still was charged with 40.0 kg. of technical grade acetic anhydride and cooled to a temperature of about 0 to 5° C. Sulfuric acid, 20.5 kg. was added slowly with stirring and the still contents were allowed to warm to about 25° C. Synthetic dl-camphor, 30.0 kg. was added to the acid-anhydride solution, and the reaction mixture was stirred at a temperature of about 28 to 32° C. for about 72 hours. The reaction mixture was then cooled to a temperature of 0–5° C. and maintained at that temperature for about 6 hours. The product, dl-camphor-10-sulfonic acid, precipitated and was filtered and washed with 50 l. of ether. The washed product was then vacuum dried at 50° C. for about 18 hours to yield 21 kg. of dl-camphor-10-sulfonic acid melting at about 199–202° C.

EXAMPLE I

Into a 30-gallon stainless steel reactor were charged 19.7 l. of acetone, 12.0 kg. of dl-camphor-10-sulfonic acid and 2.0 l. of water. The mixture was brought to reflux temperature and a solution of 6.9 kg. of α-d-4-dimethylamino-1,2-diphenyl-3-methyl-2-butanol in 29.5 l. of acetone was added over 30–40 minutes. The reaction mixture was refluxed for two hours and thereafter cooled to a temperature of about 0–5° C. The reaction mixture was maintained at a temperature of 0–5° C. for 3 hours, filtered and the crystalline precipitate thus obtained was dried overnight at 60° C. to yield 10.35 kg. of α-d-4-dimethylamino-1,2-diphenyl - 3-methyl-2-butanol d-camphor-10-sulfonate melting at about 183–188.5° C., $[\alpha]_D^{25}$ +65.70° (C=1, in chloroform).

EXAMPLE II

Dl-Camphor-10-sulfonic acid, 11.6 g. (0.05 mole) and 20 ml. of acetone were placed in a 200 ml. flask equipped with a stirrer and reflux condenser and the mixture was warmed to reflux temperature. A solution of 7.0 g. (0.025 mole) of α-d-4-dimethylamino-1,2-diphenyl-3-methyl-2-butanol in 30 ml. of acetone was added and the reaction mixture was refluxed for two hours. The reaction mixture was cooled to a temperature of 0–5° C. and maintained in the cold for about three hours. The precipitated product was filtered to yield, after drying, 10.3 g. of α-d-4-dimethylamino-1,2-diphenyl-3-methyl-2-butanol d-camphor-10-sulfonate melting at about 184–186° C. after recrystallization from ethanol, $[\alpha]_D^{25}$ +65.9° (C=1, in chloroform).

To the filtrate obtained above was added a solution of 14 g. of α-dl-4-dimethylamino-1,2-diphenyl-3-methyl- 2-butanol in 30 ml. of acetone and the mixture was stirred at room temperature for three hours. The crystalline precipitate which formed was filtered, washed with acetone and dried to yield 9.8 g. of α-l-4-dimethylamino-1,2-diphenyl-3-methyl-2-butanol l-camphor-10-sulfonate melting at about 183–186° C. after recrystallization from ethanol, $[\alpha]_D^{25}$ −64.9° (C=1, in chloroform).

The above combined filtrate and acetone wash was evaporated to dryness and the residue was dissolved in 100 ml. of ether. The ethereal solution was saturated with anhydrous hydrogen chloride to precipitate a solid which was filtered, washed with ether and dried to yield 6.8 g. of α-d-4-dimethylamino-1,2-diphenyl-3-methyl-2-butanol hydrochloride melting at about 239–242° C., $[\alpha]_D^{21}$ +53.5°, (C=1, in chloroform).

We claim:

1. The method for mutually resolving dl-camphor-10-sulfonic acid and α-dl-4-dimethylamino-1,2-diphenyl-3-methyl-2-butanol into their respective optically active d- and l-isomers which comprises (1) adding to an acetone solution of dl-camphor-10-sulfonic acid the resolving amine α-d-4-dimethylamino-1,2-diphenyl-3-methyl-2-butanol in an amount corresponding to one-half molar equivalent of said dl-acid, (2) filtering the precipitate of α-d-4-dimethylamino-1,2-diphenyl-3-methyl-2-butanol·d-camphor-10-sulfonate from the resolution mixture, (3) adding to the remaining resolution mixture α-dl-4-dimethylamino-1,2-diphenyl-3-methyl-2-butanol in an amount corresponding to two molar equivalents of the amount of l-camphor-10-sulfonic acid contained therein, (4) filtering the precipitate of α-l-4-dimethylamino-1,2-diphenyl-3-methyl-2-butanol·l-camphor-10-sulfonate from the resolution mixture, (5) separately adding to the α-d-4-dimethylamino-1,2-diphenyl-3-methyl-2-butanol·d-camphor-10-sulfonate of step 2 and to the α-l-4-dimethylamino-1,2-diphenyl-3-methyl-2-butanol·l-camphor-10-sulfonate of step 4 at least an equimolar amount of a base selected from the group consisting of ammonium hydroxide, sodium hydroxide, potassium hydroxide and calcium hydroxide to liberate the resolving amine, (6) extracting the respective amines, α-d-4-dimethylamino-1,2-diphenyl-3-methyl-2-butanol and α-l-4-dimethylamino-1,2-diphenyl-3-methyl-2-butanol with diethylether from the respective d- and l-camphor-10-sulfonic acid salts of the added base of step 5 and (7) separately acidifying the respective d- and l-camphor-10-sulfonic acid salts of the added base of step 5 with the hydrochloric acid or sulfonic acid to obtain d-camphor-10-sulfonic acid and l-camphor-10-sulfonic acid.

2. The method of claim 1 wherein in step (5) the added base is ammonium hydroxide.

References Cited

A. W. Ingersoll: J.A.C.S. *50*, 2264–67 (1928).
Pohland et al.: J.A.C.S. *77*, 3400–3401 (1955).
A. W. Ingersoll: J.A.C.S. *47*, 1168–73 (1925).

JOSEPH E. EVANS, Primary Examiner

A. SIEGEL, Assistant Examiner

U.S. Cl. X.R.
260—501.17, 570.6